INVENTORS
Nobuhiko Sezaki
Hiroshi Katagiri
Toyohisa Kaneko
BY
Stevens, Davis, Miller & Mosher
ATTORNEYS April 15, 1969 NOBUHIKO SEZAKI ET AL 3,439,213

APPARATUS FOR THE AUTOMATIC SCANNING OF LINE-STRUCTURED PATTERNS

Filed Nov. 29, 1965 Sheet 2 of 3

INVENTORS
Nobuhiko Sezaki
Hiroshi Katagiri
Toyohisa Kaneko

BY
Stevens, Davis, Miller & Mosher
ATTORNEYS

INVENTORS
Nobuhiko Sezaki
Hiroshi Katagiri
Toyohisa Kaneko

BY
Stevens, Davis, Miller & Mosher
ATTORNEYS

United States Patent Office 3,439,213

Patented Apr. 15, 1969

3,439,213

APPARATUS FOR THE AUTOMATIC SCANNING OF LINE-STRUCTURED PATTERNS

Nobuhiko Sezaki, Yokohama, Hiroshi Katagiri, Kawasaki-shi, and Toyohisa Kaneko, Tokyo, Japan, assignors to Matsushita Electric Industrial Co., Ltd., Osaka, Japan, a corporation of Japan Filed Nov. 29, 1965, Ser. No. 510,272

Claims priority, application Japan, Dec. 4, 1964, 40/69,760; June 21, 1965, 40/37,261, 40/37,262; Nov. 4, 1965, 40/68,004

Int. Cl. H01j 31/48

U.S. Cl. 315—11 6 Claims

ABSTRACT OF THE DISCLOSURE

An automatic pattern following apparatus in which an image of the pattern is first transcribed onto an electrical image storage tube and then scanned by flying spot scanning until the scanning spot encounters a part of the pattern which is then followed by the scanning spot, thereby erasing the parts of the pattern already scanned, up to the end of the part of the pattern, whereupon the next part of the pattern is searched thereby making it possible to completely follow the whole pattern, each part of which is followed only once.

This invention relates to an apparatus which is adapted to scan a pattern, such as a character or a simple combination of lines, along the lines constituting such a pattern. The present invention will hereunder be described with particular reference to characters, but it will easily be understood that the invention is also applicable to all patterns composed of lines.

Recently it has become especially necessary to read a character by a machine and to recognize the character on the basis of a signal derived from the machine as a result of the reading operation on the character. With respect to automatic reading of characters, various methods and apparatus have hitherto been proposed in the art. Of these methods and apparatus, a pattern recognition system comprising means for following a character along its component lines and means for deriving a varying signal depending on the shape of the component lines for thereby recognizing the particular character is considered to be quite excellent and useful from the view-point of biological engineering too.

It is therefore the primary object of the present invention to provide an apparatus for the automatic scanning of line-structured patterns which can more effectively and conveniently be used for the recognition of patterns than the prior apparatus of this type.

The above and other objects, advantages and features of the present invention will become apparent from the following description with reference to the accompanying drawings, in which.

Briefly, the apparatus according to the present invention comprises a flying spot scanner for converting an optical input into an electric signal, a signal-conversion type storage tube which can store the electric signal input therein and can again deliver it therefrom as an electric signal output, and control means to control the flying spot scanner and the storage tube. The signal-conversion type storage tube is of capacity discharge type and is similar to a storage tube of controlled grid type in that the electric signal is written in the form of electric charge, but is different from the latter in that, during reading operation, the electric charge is discharged, that is, the signal written therein is erased as soon as a signal is derived therefrom as a result of the reading operation.

Figure 1:
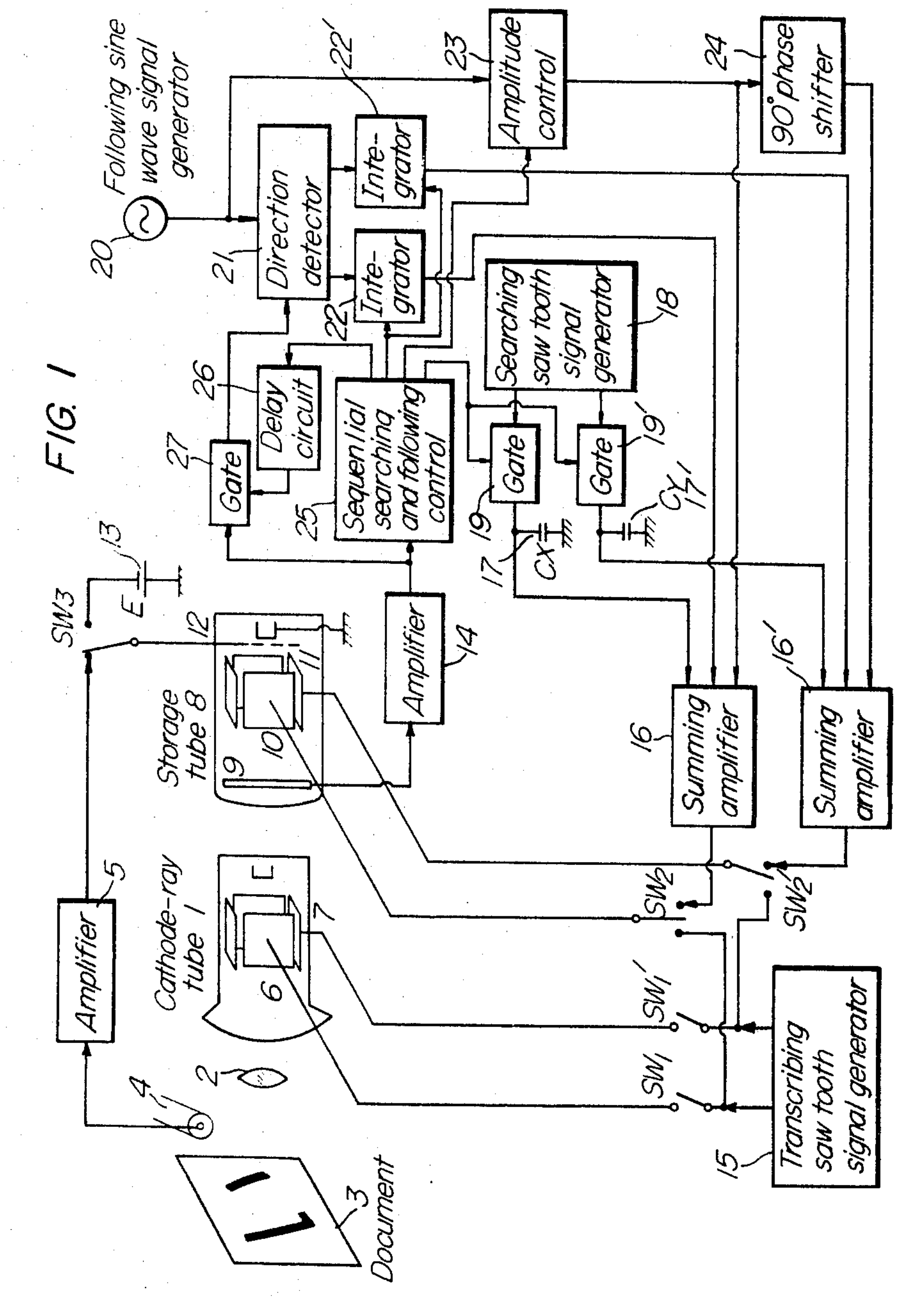
FIG. 1 is a block diagram of the apparatus embodying the present invention.

Referring to FIG. 1 of the drawings, a cathode-ray tube 1 is provided to scan a document 3. The bright spot is projected from this cathode-ray tube 1 and is focused through a suitable optical system 2 onto the document 3 to be scanned. The beam reflected from the document 3 is sensed by a phototube 4, which delivers an electric signal corresponding to brightness of the document 3. The combination of the above-described cathode-ray tube 1, the optical system 2, the phototube 4 and an amplifier 5 for amplifying the electric signal output from the phototube 4 is commonly known in the art and is called a flying spot scanner.

Figure 2:
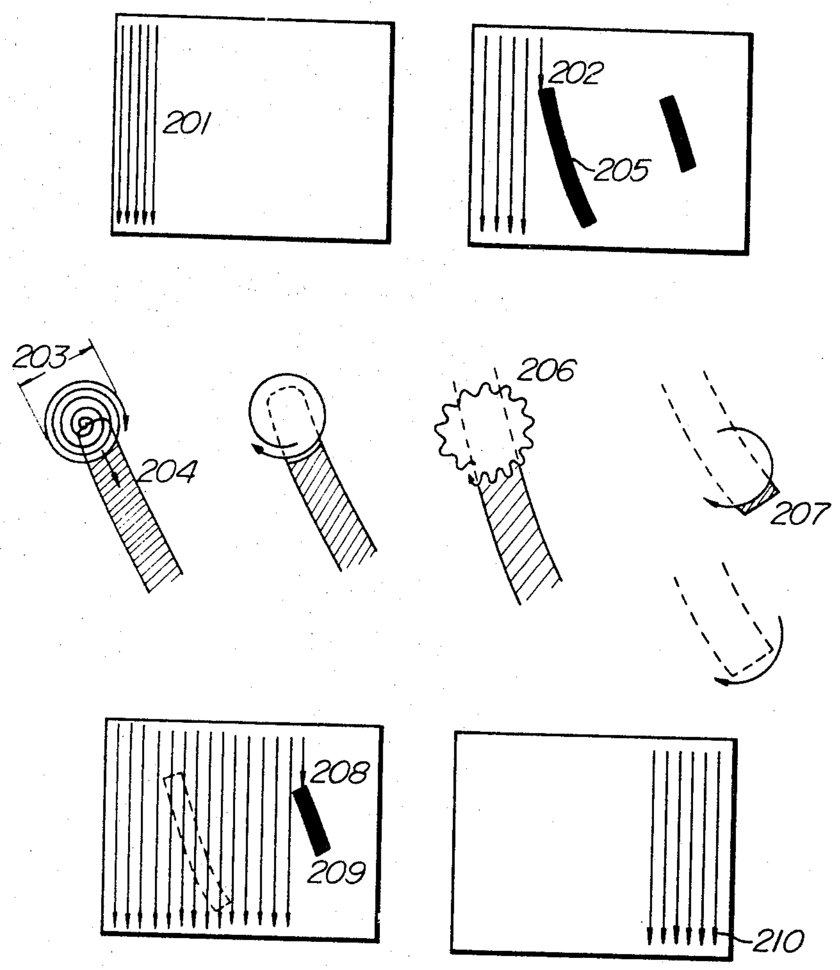
FIG. 2 is an explanatory view illustrating the principle of the operation of the apparatus according to the invention.

A sawtooth waveform signal is supplied from a transcribing sawtooth waveform signal generator 15 to deflecting electrodes 6 and 7 of the cathode-ray tube 1 and to deflecting electrodes 10 and 11 of a storage tube 8 in order to successfully scan the surface of the documents 3 in a manner as shown by scanning lines 201 in FIG. 2 to thereby transcribe a pattern, here shown as a Japanese character, Kana,

on the document 3 to a storage face 9 of the storage tube 8. The sawtooth waveform signal can be supplied by turning on switches SW1 and SW1′ and urging switches SW2, SW2′ and SW3 to their leftward positions in FIG. 1. Pattern transcription can be effected in a manner that the light reflected from the document 3 during the successive scanning on the document 3 as shown by the scanning lines 201 in FIG. 2 is received by the phototube 4 whose electric signal output is then amplified by the amplifier 5 and is conducted to a control grid 12 of the storage tube 8 to unblank the beam current. At the completion of pattern transcription, the switches SW1 and SW1′ are turned off and the switches SW2, SW2′ and SW3 are urged to their rightward positions so that the storage tube 8 is now ready to be read.

The deflecting electrodes 10 and 11 of the storage tube 8 are then controlled for the scanning of the linear pattern. At first, in order to detect a part of the character, the beam is directed in a manner as shown by scanning lines 202. This operation will hereinafter be called "searching" and the advancing movement along the line of the character after the searching will hereinafter be called "following."

At the completion of pattern transcription, gates 19 and 19′ are opened to allow for pasage therethrough of a sawtooth waveform signal from a searching sawtooth waveform signal generator 18. This signal is suitably amplified by summing amplifiers 16 and 16′ for supply to the respective deflecting electrodes 10 and 11 of the storage tube 8. When the searching beam reaches a point 202, a signal is derived from the storage tube 8 to indicate that the searching beam hits against a part of the character. This is detected by a sequential searching and following control means 25 which acts to immediately close the gates 19 and 19′, and voltages at that moment are stored in respective condensers $C_x$ and $C_y$.

At the same time, an amplitude control means 23 operates and the amplitude of the sine wave signal generated by a following sine wave signal generator 20 is amplified linearly from zero and passed to the summing amplifier 16 in one way and also passed, after shifting the phase of the signal by 90 degrees through a 90° phase shifter 24, to the summing amplifier 16' in another way. Thus, the amplitude is increased helically at the point 202 to a predetermined magnitude. It will take a time T before the diameter 203 of the circle reaches the predetermined magnitude. A delay circuit 26 is provided to make a corresponding time delay T for controlling a gate 27; and, after the period T, the gate 27 is caused to open to supply a signal from an amplifier 14 to a direction detector 21 to detect the direction of the stroke as shown by arrow 204. The structure of this direction detector 21 will be described in detail later.

In the direction detector 21, the signal from the following sine wave signal generator 20 is compared with the signal obtained from the amplifier 14 to derive a pulse of a definite pulse width to thereby effect sampling. The output from the direction detector 21 to pseudo-square pulse corresponding to the direction 204. By supplying this pulse to integrators 22 and 22', the center of the tracking beam advances a step in the direction of arrow 204. In this manner the tracking beam successively scans the unerased portion of the stroke and advances along the first stroke 205 of the character

while the pattern stored on the storage face 9 is successively erased. The distance the beam advances in one step is dependent on the magnitude of the beam spot. In other words, one step of too great distance would result in unsatisfactory erasing, while one step of too short distance would result in little signal output from the storage tube 8 and also in a slow reading speed. In order to effectively increase the size of the beam, amplitude modulation means may be added to the amplitude control means 23 so that the beam makes the so-called wobbling motion 206 and thus a greater length of the stroke can be erased in one step.

No signal will be derived from the amplifier 14 when the following beam advances further to reach the last point 207 of the first stroke 205 of the character

Absence of the signal from the amplifier 14 is detected by the sequential searching and following control means 25 which acts to urge the amplitude control means 23 to stop the following operation. After the charge of the integrating condensers in the integrators 22 and 22' has been discharged, the searching operation is restarted again from the left upper end of the storage face 9. The second searching operation may not necessarily be started from the left upper end of the storage face 9 but may desirably be started from the point 202. However, the operation may be started from the left upper end if it is convenient in view of the structure and arrangement of the apparatus. Since the first stroke 205 of the character

has already been erased, a signal is derived from the amplifier 14 when the searching beam reaches a point 208 of the second stroke. The following operation thereafter is effected in a maner entirely similar to the first tracking operation. At an end point 209 of the second stroke of the character

the following operation is completed and a third searching operation is then started. Since all the pattern on the storage face 9 of the storage tube 8 has already been erased, no signal is derived from the amplifier 14 during the searching operation from the left upper end to an end point 210 at the right lower end of the storage face 9. The sequential searching and following control means 24 detects the ending of the searching operation, and the searching and following scanning on one pattern is completed.

Figure 3:
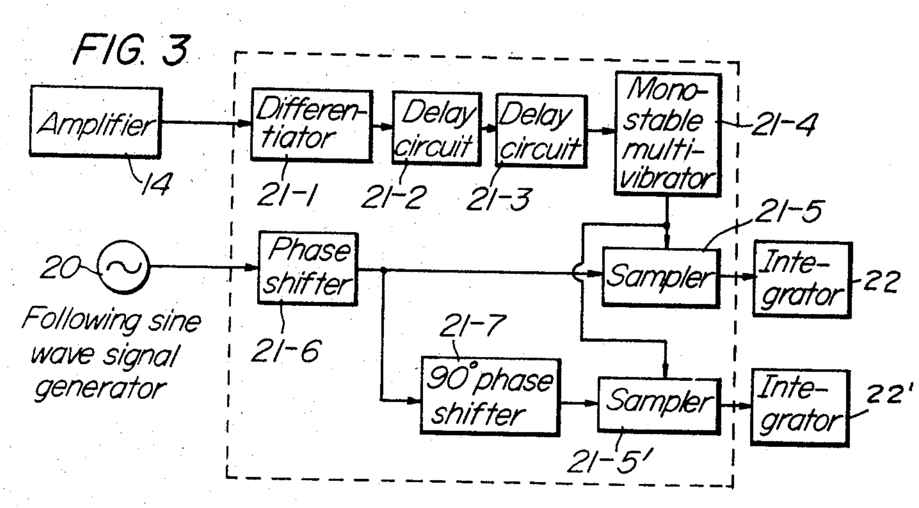
FIG. 3 is a block diagram of a direction detector forming part of the apparatus of the invention.
Figure 4:
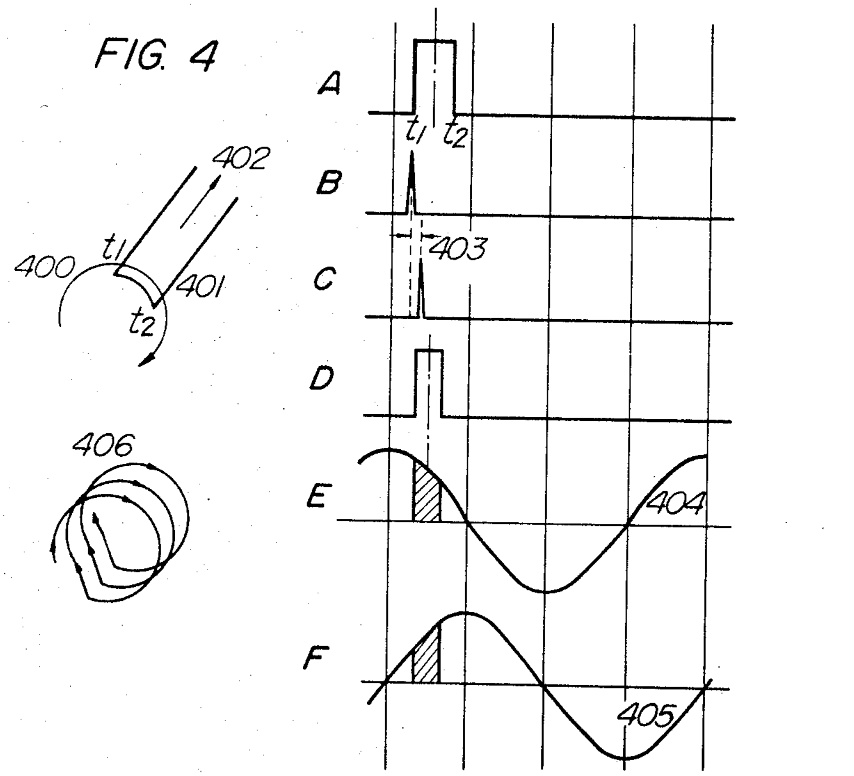
FIG. 4 is an explanatory view illustrating the manner of operation of the direction detector.

The structure and operating principle of the direction detector 21 wil be described in detail with reference to FIGS. 3 and 4. Suppose a gyrating following beam 400 as shown in FIG. 4 is used to scan a stroke 401 of a character. Then a pulse waveform corresponding to a direction as shown by arrow 402 of the stroke 401 is derived from the amplifier 14 as shown in waveform A of FIG. 4. This pulse is differentiated by a differentiator 21–1 to solely obtain a differentiated positive pulse as shown in waveform B. This pulse is supplied into a delay circuit 21–2 to obtain a pulse delayed by a time interval 403 as shown in waveform C. The pulse of waveform C is used to trigger a mono-stable multivibrator 21–4 to derive therefrom a pulse waveform as shown in waveform D. The delay time 403 is suitably adjusted so that the center of the pulse in waveform D aligns with the center of the pulse in waveform A. This pulse having the waveform as shown in waveform D is supplied to samplers 21–5 and 21–5' to sample a sine waveform 404 and a cosine waveform 405 which are in phase with the tracking sine and cosine waveforms, respectively. The direction detector 21 operates on the operating principle as described above, but since the sampled outputs are supplied to the integrators between time $t_1$ and time $t_2$, a delay circuit 21–3 and a phase shifter 21–6 are interposed in the circuit of the direction detector 21 so that the respective outputs are 180° delayed and are supplied to the integrators at a time exactly opposite to the time intermediate between the times $t_1$ and $t_2$. Consequently, the following beam moves along tracking such a curve as shown by 406 in FIG. 4.

In the above system, a vidicon may be used to eliminate the step of pattern transcription and to extremely simplify the operation because the vidicon is operative to convert a pattern signal directly into an electric signal and to store the pattern intact. Though a vidicon is not an image storage tube in the usual meaning of its use, the residual image on the target remains long enough to allow the complete following of a pattern in this invention. Therefore, it can be considered as an image storage tube for the purpose of this invention The above description has referred to a case in which such a progressively displacing circular movement as shown by numeral 406 in FIG. 4 (such motion is referred to as "an advancing circular motion) is used to derive a signal from a pattern stored on the storage face 9 of the storage tube 8 while successively erasing such pattern to thereby effect the direction detection and following of the pattern, but it is apparent that the flying spot scanner itself can be used for the purpose of the direction detection and following. By this direct following, a pattern can be recognized more precisely, being free from any deformation or deterioration of the pattern which may result from the transcription of the pattern. In this case, however, a difficulty may be encountered in that the portion of a pattern having been once tracked may not be distinguished from that portion of the pattern which has not yet been tracked, with the result that the tracking beam continues to make its circulating movement in case of a pattern of a closed loop and can not properly follow pattern strokes in case of a character such as

which is composed of two strokes separated from each other. This difficulty can be remedied by arranging in a manner that a pattern on a document is once transcribed on the storage face 9 of the storage tube 8 and the flying spot scanner is driven to directly search and follow the pattern on the document, while that portion of the pattern stored on the storage face 9 of the storage tube 8 which corresponds to the already followed portion is successively discharged. By arranging in this manner, distinction between those portions which have already been followed and which have not yet been followed can easily be effected and therefore pattern detection can easily be made because a signal is derived from both the flying spot scanner and the storage tube as the following beam moves along that portion of the pattern which has not yet been followed whereas in case of the pattern portion which has once been followed no signal is derived from the storage tube 8 although the flying spot scanner delivers a signal.

As an alternative arrangement, a storage tube of the controlled grid type, in which the electric image stored therein is not erased during the reading operation, can be used in place of the storage tube of capacity discharge type to record the portion of the pattern which has already been followed by the flying spot scanner.

In both cases the distinction may be realized by the provision of a comparator which compares the output from the amplifier 5 in the flying spot scanner with the output from the amplifier 14 associated with the storage tube 8 and the additional provision of a gate driven by the comparator and inserted between the amplifier 5 and the direction detector 21.

What we claim is:

1. An apparatus for the automatic following of a line-structured pattern comprising means for producing an electrical image of said pattern, means for converting said electrical image to a sequence of electric signals by the medium of an electron beam and providing an output signal, means for generating a first pair of signals to be applied to said image converting means for controlling said electron beam for a pattern searching operation, means for generating a second pair of signals to be applied to said image converting means for imposing a small circular movement on said electron beam, means for suppressing said second pair of signals while said output signal is not being produced, means for holding said first pair of signals, while said output signal is being produced, at a level which said signals had at the instant when said output signal was first produced as a result of said pattern searching operation, and means for generating a third pair of signals to be applied to said image converting means for controlling said electron beam in response to phasic position of said output signal in relation to said second pair of signals, thus to cause said small circular movement of said electron beam to advance following said pattern.

2. An apparatus according to claim 1 in which said means for producing an electrical image of a pattern and said means for converting said electrical image to electric signals comprise a flying spot scanner and a capacitance-discharge type storage tube, respectively.

3. An apparatus according to claim 1 in which said means for producing an electrical image of a pattern and said means for converting said electrical image to the electric signal include a vidicon.

4. An apparatus according to claim 1 in which said means for producing the electrical image of a pattern and said means for converting said electrical image to electric signals comprise a flying spot scanner and a capacitance-discharge type storage tube, said three pairs of signals to be applied to said image converting means being applied also to said flying spot scanner for controlling the electron beam of said flying spot scanner, and further comprising means for comparing the signal from said flying spot scanner with the output signal from said storage tube to produce a discriminating signal with regard to substantial coincidence of both signals, and gate means for providing said output from said flying spot scanner to said signal suppressing means, said signal holding means and said means for generating said third pair of signals in response to said discriminating signal.

5. An apparatus according to claim 1 in which said means for converting said electrical image to electric signals comprises a flying spot scanner and a controlled grid type storage tube.

6. An apparatus accordnig to claim 1 in which said means for generating said second signals further comprises an amplitude modulating means to impart a wobbling motion to said small circular movement of the electron beam.

References Cited

UNITED STATES PATENTS

| | | | |
|---|---|---|---|
| 2,974,254 | 3/1961 | Fitzmaurice et al. | 315—10 |
| 3,229,100 | 1/1966 | Greanias | 250—202 |

RICHARD A. FARLEY, *Primary Examiner.*

T. H. TUBBESING, *Assistant Examiner.*

U.S. Cl. X.R.

250—202; 315—24